United States Patent

[11] 3,631,267

[72] Inventor Gary Lee Heimbigner
Anaheim, Calif.
[21] Appl. No. 47,477
[22] Filed June 18, 1970
[45] Patented Dec. 28, 1971
[73] Assignee North American Rockwell Corporation

[54] BOOTSTRAP DRIVER WITH FEEDBACK CONTROL CIRCUIT
7 Claims, 3 Drawing Figs.

[52] U.S. Cl. ........ 307/270, 307/237, 307/251, 307/304, 328/173, 328/176
[51] Int. Cl. ........ H03k 3/26
[50] Field of Search ........ 307/205, 237, 251, 270, 304; 328/54, 173, 176; 330/156

[56] References Cited

UNITED STATES PATENTS

| | | | |
|---|---|---|---|
| 3,430,072 | 2/1969 | Stevens | 307/250 |
| 3,480,796 | 11/1969 | Polkinghorn et al. | 307/205 X |
| 3,506,851 | 4/1970 | Polkinghorn et al. | 307/251 |

*Primary Examiner*—Stanley T. Krawczewicz
*Attorneys*—L. Lee Humphries, H. Fredrick Hamann and Robert G. Rogers

ABSTRACT: A control circuit detects a minimum output voltage level and feeds back that voltage level to boost the voltage across a capacitor connected between the control circuit and the gate electrode of a load-driving field effect transistor. The voltage on the gate electrode of the transistor is boosted to a voltage in excess of the threshold voltage of the transistor plus the minimum required output voltage.

INVENTOR.
GARY L. HEIMBIGNER
BY
Robert G. Rogers
ATTORNEY

INVENTOR.
GARY L. HEIMBIGNER

BY Robert G. Rogers
ATTORNEY

BOOTSTRAP DRIVER WITH FEEDBACK CONTROL CIRCUIT

BACKGROUND OF THE INVENTION

1. Field of Invention

The invention relates to a bootstrap driver using an output voltage detector circuit and, more particularly, to such a driver in which a minimum output voltage is detected for providing a relatively higher voltage on the control electrode of an output driver device.

2. Description of Prior Art

Certain subsystems or circuits in an electronic system require a relatively high power or minimum voltage level. The system may be produced in a semiconductor chip. The voltage level is usually supplied to the chip as a supply voltage and is provided at an output of, for example, a driver output, as a function of logical conditions within the system.

It is important that certain circuits of the chips receive the maximum level of the supply voltage. In other words, in some cases, it is necessary to provide the supply voltage to an input, or output, as the case may be, without voltage drops and with minimum delays.

In some cases, the supply voltage can be increased to compensate for the drops. However, an increased supply voltage increases power consumption and in some cases may exceed the operating limits of the semiconductor devices comprising the electronic system.

At the present time, output drivers are operated in a bootstrap mode in order to overcome the threshold voltage drop across the output device. One such bootstrap output driver can be seen by referring to U.S. Pat. No. 3,506,851, issued Apr. 14, 1970, entitled MOS Transistor Driver Using Capacitor Feedback, by R. W. Polkinghorn et al.

As can be seen from the referenced patent application, a bootstrap output driver is one in which a capacitor is connected between the output (source electrode) and the gate electrode of a field effect transistor. The output voltage is fed back to the gate electrode to boost the voltage of the gate electrode for overcoming the threshold loss through the field effect transistor driver.

In many systems, the above type of arrangement is satisfactory. However, the satisfactory operation of such a circuit is, to a certain extent, dependent on the RC time constant of the load. For example, if the RC time constant of the load is approximately equal to the RC time constant of the bootstrap feedback circuit, the output increases at the same rate as the voltage on the gate electrode. As a result, the boosting effect does not occur. In order for the boosting to occur, the RC time constant of the output must be substantially greater than the RC time constant of the bootstrap feedback circuit. In that case, the feedback capacitor charges very quickly for enhancing the conduction of the load field effect transistor.

It is necessary that the voltage boost occur after the feedback capacitance has been charged to at least one threshold voltage level. In one circuit, the anticipated delay in charging the bootstrap or feedback capacitance is calculated. A delay circuit is then connected between the input and the gate electrode of the output drive transistor for delaying the input voltage by an amount at least equal to the delay time for charging this capacitance. When the capacitance has been charged, a boost voltage derived from the input is provided across the capacitance and, therefore, on the gate electrode of the drive device for enhancing the conduction of the output driver until output is driven to the voltage on the drain electrode of the output driver.

However, the above circuit arrangement is not entirely satisfactory since the load may change without changing the delay for boosting the output which is fixed. Since the delay may also be in excess of the time required to charge the output capacitance, the speed of the electronic system may be reduced.

A bootstrapped circuit is required which is independent of the load capacitance. The preferred circuit will boost the voltage on the gate electrode of the output driver as a function of a detected minimum voltage level. In that way, the RC time constant of a load relative to the RC time constant of a bootstrap feedback circuit would not materially affect the operation of the circuit. The gate electrode voltage would be boosted as soon as possible to provide a higher output voltage. Where field effect transistors are being used to implement the circuits, the minimum detected output voltage is a function of the threshold voltage of the device being driven by that detected voltage level.

SUMMARY OF THE INVENTION

Briefly, the invention comprises a bootstrapped driver circuit feeding back a detected output voltage level for boosting the voltage on the control electrode of the output driver. As a result of making the feedback dependent on a minimum detected output voltage, the driver is relatively independent of the load RC time constant and the circuit operation is not delayed unnecessarily. The boost occurs when the minimum output voltage level is detected.

In the preferred embodiment, the bootstrapped driver comprises a load field effect transistor connected between a first voltage level representing one logic state and the output. The first logic level ordinarily represents the output voltage level required to drive other circuits and electronic devices. A resetting field effect transistor is connected between the output and a second voltage level representing a second logic state. The input to the bootstrap driver is connected directly to the control electrode of the resetting transistor and through an inverter to the control electrode of the load transistor.

An output voltage level detector is connected between the output and a capacitor which is in series with the detector circuit and the control electrode of the load transistor. Under conditions when the load transistor is turned on by an input signal, the output voltage is driven to a minimum voltage level. When the minimum voltage level is detected by the control circuit, a relatively higher voltage is provided to boost the voltage across the capacitor and, therefore, the voltage at the control electrode.

The relatively higher voltage is selected so that the voltage of the capacitor and, therefore, the voltage at the control electrode of the load transistor is equal to the minimum required output voltage plus the maximum threshold voltage of the load transistor. As a result, the conduction of the load transistor is enhanced and the output is driven to the required voltage level.

It is pointed out that where P-type MOS devices are used, the first voltage level would be a negative voltage and the second voltage level would be electrical ground. P-type MOS devices may have a threshold voltage of approximately 5 or 6 volts. However, low-threshold devices are available. Where N-type MOS devices are used, the first voltage level would be a positive voltage and the second voltage level electrical ground or at least this polarity relationship. A circuit may also be used in which the first voltage level is positive and the second voltage level is negative.

Therefore, it is an object of this invention to provide an improved bootstrap driver circuit in which the feedback is controlled by a detection circuit connected between the output and boost capacitor connected to the control electrode of the output driver.

It is another object of this invention to provide a self-compensating bootstrapped driver circuit.

A still further object of this invention is to provide a bootstrapped driver using a feedback circuit which detects a minimum output voltage level for causing a boost in the output voltage.

A still further object of this invention is to provide an improved bootstrapped driver circuit using a feedback control circuit for overcoming the threshold voltage drop across the output driver independent of the load capacitance.

A still further object of the invention is to provide an improved bootstrap driver circuit using a feedback control circuit which responds to a minimum output voltage level independent of delay techniques.

These and other objects of the invention will become more apparent when taken in connection with the description of the drawings, a brief description of which follows.

DESCRIPTION OF PREFERRED EMBODIMENT

Figure 1:
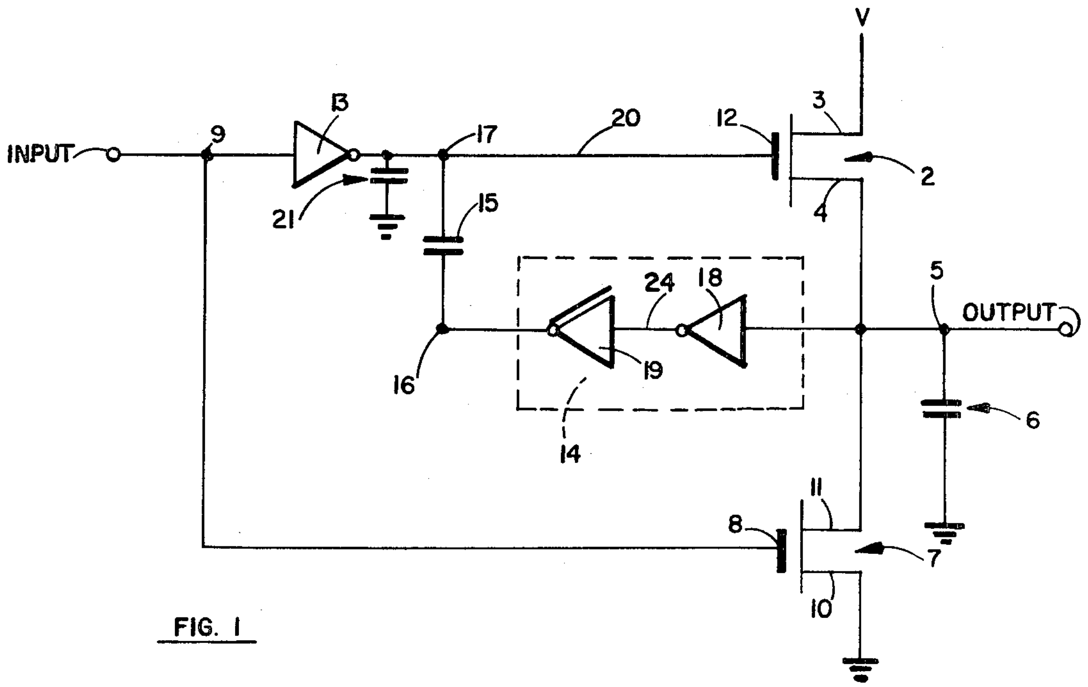
FIG. 1 is a logic diagram of one embodiment of the bootstrap driver circuit showing the feedback control circuit.

FIG. 1 is a logic diagram of one embodiment of bootstrap driver 1 comprising a load field effect transistor 2 having its drain electrode 3 connected to supply voltage V and its source electrode 4 connected to output 5. The output load capacitance is represented by capacitor 6 connected between the output and ground.

Resetting field effect transistor 7 is connected between the output 5 and electrical ground. Its gate electrode 8 is connected to input 9. Its source electrode 10 is connected to electrical ground and its drain electrode 11 is connected to output 5. Gate electrode 12 of load transistor 2 is connected to the output of inverter 13. The inverter 13 inverts the input signal received at input 9.

The driver 1 also includes a feedback control circuit 14 connected between output 5 and one plate of capacitor 15. The electrical connection to the one plate is designated by the numeral 16. As a practical matter numeral 16 represents a plate of the capacitor which is formed by diffusion techniques. The other plate of capacitor 15 is connected to the gate electrode 12 of the load transistor 2. The connection is designated by the numeral 17. Numeral 17 actually represents the metal plate of the capacitor.

The feedback control circuit includes a first inverter 18 and a second inverter 19 with a bootstrapped output stage. Numeral 24 designates the output of inverter 18 and the input to inverter 19. Bootstrapped outputs are described and shown in the previously referenced patent application.

The additional inherent and stray capacitance along line 20 is represented by capacitor 21 connected to ground. Capacitor 21 is usually small relative to capacitor 15. For that reason, it is assumed not to interfere with the operation of the circuit. In practice, a portion of the charge on capacitor 15 is used to maintain a charge on capacitor 21. If capacitor 15 is large relative to capacitor 21, however, the division of charge is relatively slight.

In the operation of the FIG. 1 circuit, when the input 9 is true, device 7 is turned on and output 5 is connected to ground. Electrical ground may be used to represent one logic state. When the input 9 is false, field effect transistor 7 is held off and the output from inverter 13 is true, thereby enabling capacitor 15 to charge.

When the voltage at the output of inverter 13 exceeds the threshold voltage of transistor 2, transistor 2 is rendered conductive. For purposes of describing the FIG. 1 embodiment, it is assumed that the output voltage level from inverter 13 exceeds the threshold voltage of device 2 by at least two thresholds. As a result, the output 5 is set to a voltage level equal to one threshold. In other words, the voltage on output 5 is sufficient to turn on a field effect transistor similar to transistor 2. Capacitor 15 also charges to the voltage on gate electrode 12 which for purposes of the description is assumed to be equal to two threshold voltage levels.

The minimum voltage level on output 5 is inverted through inverter 18 and is used as a drive voltage for bootstrap inverter 19. Since inverter 19 is bootstrapped, the minimum drive voltage turns the device on for producing an output voltage from device 19 equal to V. For purposes of this description, the voltage level V is the same as voltage V on drain electrode 3 of device 2 and is the required output voltage level from driver 1.

When the voltage V appears at point 16 the voltage at point 17 is raised to the two threshold voltage level originally on capacitor 15 plus the voltage V. As a result, therefore, of the feedback of the relatively low voltage level on output 5, the voltage on gate electrode 12 is substantially increased. Therefore, the conduction of load transistor 2 is substantially enhanced for driving the output 5 to the voltage V which, as indicated above, is required for driving other electronic circuits and devices.

Figure 2:
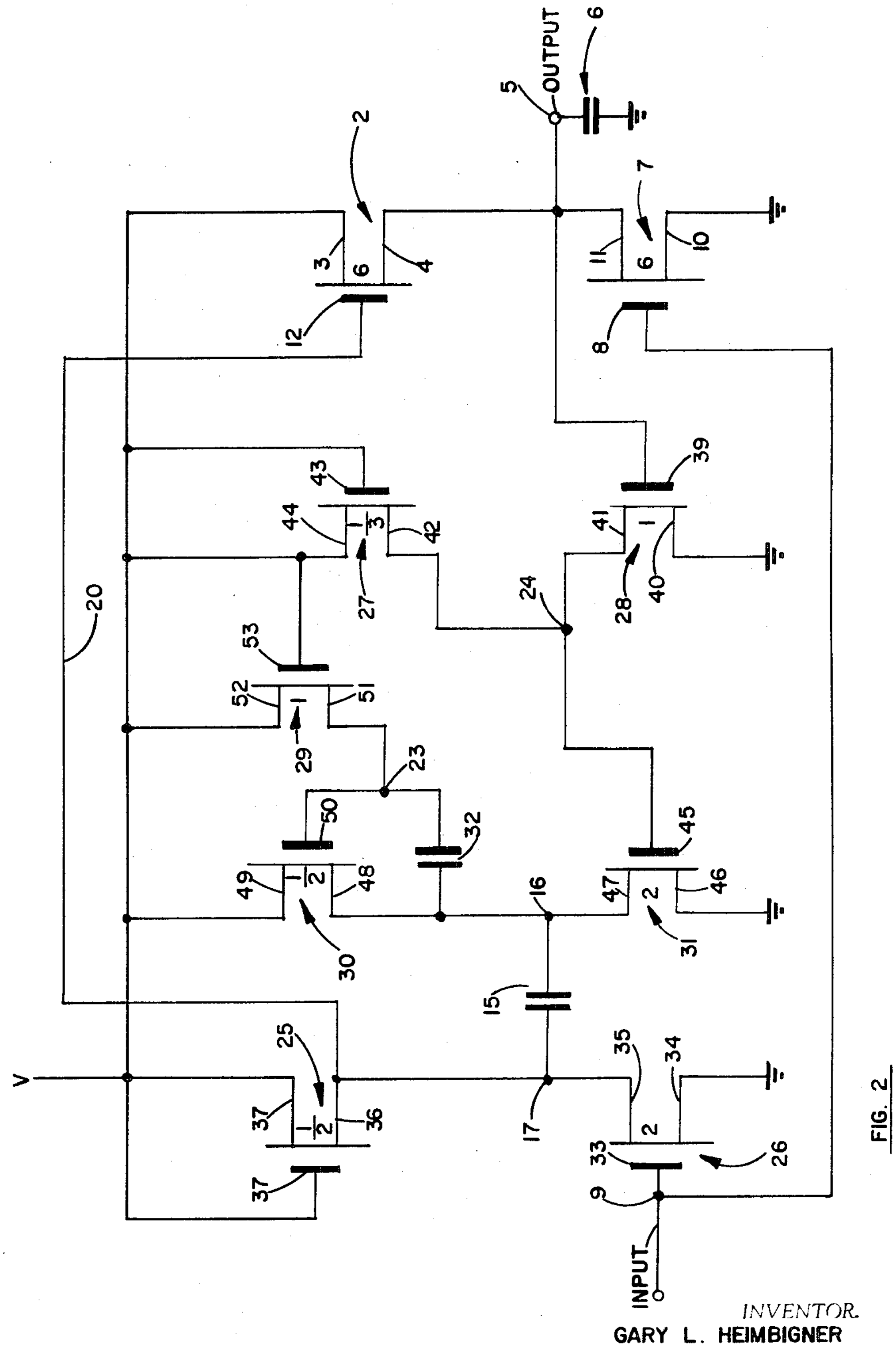
FIG. 2 is a schematic diagram of one embodiment of the FIG. 1 logic diagram showing an embodiment of field effect devices for implementing the FIG. 1 diagram.

FIG. 2 is a specific circuit diagram of the FIG. 1 circuit. Output transistors 2 and 7 are identical to the same transistors shown in FIG. 1. The inverter 13 of FIG. 1 is represented by field effect transistors 25 and 26. Capacitor 15 is designated by the same number as FIG. 1. Capacitor 32 is the feedback capacitor comprising the bootstrap circuit of bootstrapped inverter 19 which also includes field effect transistors 29, 30 and 31. Field effect transistors 27 and 28 represent inverter 18. The input terminal 9, output terminal 5 and output load capacitance 6 are also noted as shown in FIG. 1. Point 16 and point 17 are numbered to correspond to identical points in FIG. 1.

The numbers adjacent to the transistors refer to the relative conductances of the devices. Transistors 2 and 7 are relatively large devices for passing high currents to the output. The other field effect transistors are relatively smaller since the other transistors are required to pass smaller currents. The significance of the relative conductances of the devices will become more apparent during the following description of the FIG. 2 circuit.

The input 9 is connected to the gate electrode 3 of field effect transistor 26 which has its source electrode 34 connected to ground. Its drain electrode 35 is connected to the source electrode 36 of field effect transistor 25 which has its gate electrode 37 and drain electrode 38 connected to the supply voltage V. The output from field effect transistors 25 and 26 at point 17 provides a drive voltage on the gate electrode 12 of the field effect transistors 2 which has its drain electrode 3 connected to the supply voltage V. Its source electrode 4 is connected to output 5.

As indicated in connection with FIG. 1, field effect transistor 2 comprises the load device for the driver 1. The resetting field effect transistor 7 for the driver has its drain electrode 11 connected to output 5 and its source electrode 10 connected to electrical ground. It receives a drive voltage on its gate electrode 8 directly from input 9.

A voltage is fed back from the output 5 to field effect transistor 28 on its gate electrode 39. The source electrode 40 is connected to ground and the drain electrode 41 is connected to the source electrode 42 of field effect transistor 27. Field effect transistor 27 has its gate electrode 43 and its drain electrode 44 connected to the supply voltage.

Common point 24 between transistors 27 and 28 is connected to gate electrode 45 of field effect transistor 31, which also has its source electrode 46 connected to electrical ground and its drain electrode 27 connected to one plate of capacitor 15 at point 16. The other plate of capacitor 15 is connected to point 17 at the output of the first inverter stage. How the capacitor boosts the voltage level on the gate electrode 12 of transistor 2 is described in more detail subsequently.

Source electrode 48 of transistor 30 is also connected to point 16. The drain electrode 49 is connected to the supply voltage V. The gate electrode 50 receives a drive voltage from the source electrode 51 of transistor 29 which has its drain electrode 52 and gate electrode 53 connected to the supply voltage V.

Transistor 26 has a plotted conductance ratio of 2:1/2 relative to transistor 25. That enables transistor 26 to conduct relatively larger amounts of current than transistor 25. Similarly, transistor 31 has a plotted conductance more of 2:1/2 relative to transistor 30 enabling transistor 31 to conduct more current than transistor 30. Transistor 27 has a plotted conductance which is one-third the conductance of transistor 28. As a result, substantially more voltage is dropped across 27 than 28 when both are conducting. Transistor 29 is required to supply charge current to capacitor 32. Output transistors 2 and 7 have relatively large conductances since both are required to supply relatively large load currents at different phases of the circuit's operation.

Figure 3:
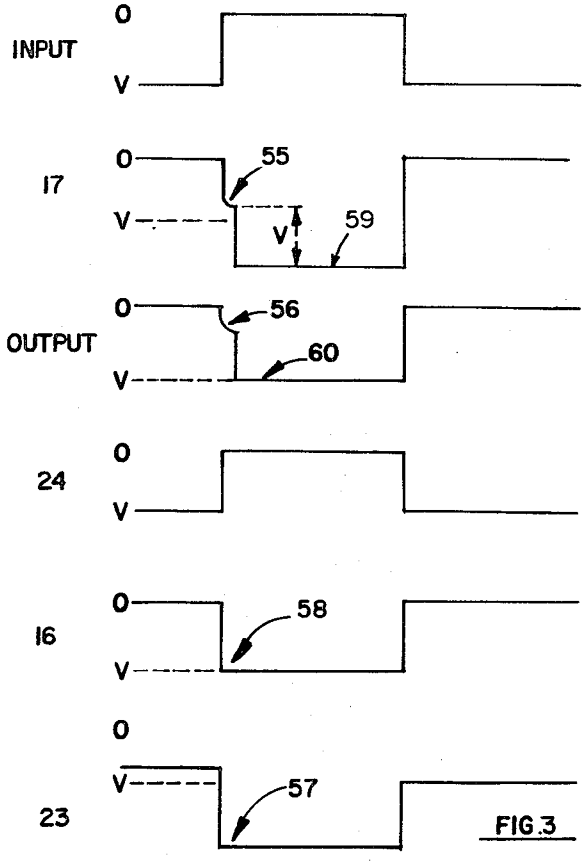
FIG. 3 is a diagram of signals taken at various points in the FIG. 2 circuit.

The operation of the circuit can best be understood by referring to FIG. 2 and FIG. 3. FIG. 3 shows the signals taken at various points in the FIG. 2 circuit. For purposes of describing the operation, it is assumed that the supply voltage is approximately −25 volts and that a threshold voltage of approximately −6 volts is required to turn on the field effect transistors. The other voltage level is assumed to be electrical ground.

When the input is true, −V, transistor 26 is turned on so that point 17 is at electrical ground. Similarly, transistor 7 is turned on and the output is also at electrical ground. Since the output is at electrical ground, the drive voltage on gate electrode 39 of transistor 28 is too low to turn the transistor on. At least one threshold voltage level is required to turn a transistor on. In addition, since the gate electrode 43 and the drain electrode 44 are both connected to the supply voltage, transistor 27 is turned on and point 24 is driven to approximately the supply voltage minus the threshold drop of transistor 27.

Similarly, transistor 29 is turned on for driving point 23 to a voltage equal to the supply voltage minus the threshold drop across transistor 29. The voltage at point 23 provides a drive voltage for turning transistor 30 on. Transistor 31 is turned on by the drive voltage at point 24 for driving point 16 to electrical ground. Transistor 31 is much larger than transistor 30 in that point 16 is approximately at electrical ground.

When the input changes from a true level to a false level, i.e., from logic one to logic zero, transistor 26 turns off and point 17 drops towards the supply voltage. Point 17 initially drops to a voltage level approximately one threshold less than the supply voltage due to the threshold drop across transistor 25. The point is illustrated in FIG. 3 by the curved portion of signal 17 identified by the numeral 55. Since point 17 is more than two threshold voltage levels negative, transistor 2 is turned on. The output 5 drops towards the supply voltage minus the two threshold voltage drops across transistor 25 and transistor 2. That voltage level is identified by the numeral 56.

Assuming an initial supply voltage of −25 v minus the two threshold drops of −12 v, the voltage at the output would initially be approximately 13 volts. However, only one threshold, i.e., −6 volts, is required to turn transistor 28 on. Therefore, regardless of the size of the load capacitance 6, output 5 is driven to at least one threshold voltage level in a relatively short period of time. Therefore, transistor 28 is controlled independent of the size of the load capacitance.

When transistor 28 turns on, point 24 is driven towards ground. Transistor 27 remains on. However, since transistor 27 is small relative to transistor 28, substantially all of the supply voltage is dropped across 27 so that point 24 is approximately equal to electrical ground. The voltage on gate electrode 53 of transistor 29 holds transistor 29 on. In addition, since point 24 is at electrical ground, transistor 31 turns off to cause point 16 to drop towards the supply voltage.

Capacitor 32 was previously charged to the difference between the voltages at point 16 and point 23, i.e., approximately −V minus a threshold. Therefore, when point 16 changes from electrical ground towards −V, the voltage is fed back to point 23 for boosting the voltage on gate electrode 50 of transistor 30. As a result, the conduction of transistor 30 is substantially enhanced and point 16 is driven to −V without the threshold drop across transistor 30. In other words, the voltage at point 23 is driven to approximately −40 volts, for the example selected, and the threshold drop through transistor 30 is overcome. The change in voltage at point 23 is represented in FIG. 3 by the numeral 57. The voltage at point 16 is identified by the numeral 58.

When point 16 changes from approximately electrical ground to the supply voltage, the change is coupled across capacitor 15 to point 17. Capacitor 32 is substantially smaller than capacitor 15 therefore capacitor 32 charges relatively fast so that point 16 drops to the supply voltage almost immediately relative to the charge of the capacitor 15. Therefore, when 16 drops from electrical ground to the supply voltage, point 17 which was initially driven to the voltage represented by numeral 55 then drops an added amount approximately equal to the supply voltage. The new level is identified by the numeral 59.

Since point 17 is also connected to gate electrode 12 the conduction of field effect transistor 2 is substantially enhanced to drive the output 5 from the voltage level represented by numeral 56 to the supply voltage level represented by the numeral 60. As a result, the output is driven to the required output voltage level.

It should be obvious, therefore, that a relatively minimum output voltage level is detected initially by transistor 28 as part of a feedback circuit. That minimum voltage level is coupled through the feedback circuit to provide a substantial boost in the voltage on point 17 which is directly coupled to the gate electrode 12 of the load transistor 2. Since a minimum output voltage level is required to be detected, the feedback circuit operation is relatively independent of the load capacitance. Some delays are involved as illustrated by the slight curved portions of signals at point 17 and at the output. However, the delays are relatively minor and do not interfere with the overall operation of the circuit.

Although threshold voltages of approximately 6 volts were used when describing the FIG. 2 embodiment, tests have been run to indicate that the FIG. 2 circuit will operate satisfactorily while driving load capacitances of between 10 to 100 pf. with threshold voltage levels from 3 to approximately 5 volts.

I claim:

1. An output voltage driver circuit having an input and an output, said circuit comprising, first and second field effect transistors connected in electrical series between first and second voltage levels, said output connected at a common point between said first and second field effect transistors, each of said field effect transistors having a control electrode, capacitor means having a first of its electrodes connected to the control electrode of the first field effect transistor, said capacitor means storing voltage levels appearing on said control electrode of said first field effect transistor, said input connected to the control electrode of said second field effect transistor, a field effect transistor feedback circuit connected between the output and the second electrode of said capacitor means, said field effect transistor feedback circuit amplifying voltage levels appearing on the output and providing said amplified voltage levels to the second electrode of said capacitor means for substantially increasing the voltage level stored by said capacitor means, said increased voltage level providing a boosted voltage level on the control electrode of the first field effect transistor for enhancing the conduction of said first field effect transistor for enhancing the conduction of said first field effect transistor whereby the output is driven to said first voltage level.

2. The circuit recited in claim 1 further including an inverting circuit connected between said input and the control electrode of said first field effect transistor for enabling only one of said first and second field effect transistors to be conductive at any particular interval.

3. The output voltage driver circuit recited in claim 1 wherein said field effect transistor feedback circuit includes an inverter for initially inverting the voltage level on said output, said field effect transistor feedback circuit further including an amplifier connected between said inverter and the second plate of said capacitor means for receiving the voltage level from said inverter circuit, said inverted minimum voltage level being amplified for providing said increased voltage level to said capacitor means.

4. A bootstrap driver circuit having an input and an output, said circuit comprising, load field effect transistor means having a control electrode, resetting field effect transistor means having a control electrode, said load field effect transistor means and said resetting field effect transistor means connected in electrical series between first and second voltage levels, said output connected at a common point between said load field effect transistor means and said resetting field effect transistor means, capacitor means having a first of its two plates connected to the control electrode of said load field effect transistor means and to said input for initially storing a voltage level provided on said input for at least initiating conduction of said load field effect transistor means, a first field effect transistor circuit means for detecting a minimum voltage level at the output, a second field effect transistor circuit means connected between said first field effect transistor circuit means and the second plate of said capacitor means, said second field effect transistor circuit means responsive to the detected minimum voltage level or amplifying and feeding back the amplified voltage level to the second plate of said capacitor means for substantially boosting the voltage level on the control electrode of said load field effect transistor means whereby the conduction of the load field effect transistor means is substantially increased for driving the output to said first voltage level.

5. The circuit recited in claim 4 and further including an inverter connected between the input and the control electrode of the load field effect transistor means, the first plate of said capacitor means connected at a common point between said inverter and said control electrode, said input connected to the control electrode of said resetting field effect transistor means, said inverter preventing said load field effect transistor means and said reset field effect transistor means from becoming conductive simultaneously.

6. The circuit recited in claim 4 wherein said first field effect transistor circuit means for detecting comprises a first inverter connected between said output and said second field effect transistor circuit means responsive, said second field effect transistor circuit means responsive comprising a second inverting and amplifying circuit for providing said relatively larger voltage level to said capacitor means in response to said detected minimum voltage level, said voltage level on said capacitor means being increased from the voltage level initially stored when the load field effect transistor means was initially turned on by an amount equal to the voltage level provided by said second field effect transistor circuit means responsive.

7. The circuit recited in claim 6 wherein said second field effect transistor circuit means responsive comprises a bootstrapped inverter whereby the minimum detected output voltage level is inverted twice and increased before boosting the voltage on the control electrode of said load field effect transistor means.

* * * * *